United States Patent
Hong et al.

(10) Patent No.: US 11,407,853 B2
(45) Date of Patent: Aug. 9, 2022

(54) EXPANDABLE POROUS ORGANIC POLYMER-BASED HYDROGEN ION CONDUCTIVE MATERIAL AND METHOD FOR PREPARING SAME

(71) Applicant: Korea University Research and Business Foundation, Seoul (KR)

(72) Inventors: Chang Seop Hong, Seoul (KR); Dong Won Kang, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 490 days.

(21) Appl. No.: 16/497,081

(22) PCT Filed: Mar. 27, 2018

(86) PCT No.: PCT/KR2018/003619
§ 371 (c)(1),
(2) Date: Sep. 24, 2019

(87) PCT Pub. No.: WO2018/190535
PCT Pub. Date: Oct. 18, 2018

(65) Prior Publication Data
US 2020/0017630 A1    Jan. 16, 2020

(30) Foreign Application Priority Data

Apr. 13, 2017  (KR) .................. 10-2017-0047985

(51) Int. Cl.
| | |
|---|---|
| *C08G 61/10* | (2006.01) |
| *C08J 9/28* | (2006.01) |
| *H01M 8/10* | (2016.01) |
| *H01M 8/1025* | (2016.01) |
| *H01M 8/1032* | (2016.01) |

(52) U.S. Cl.
CPC ............. *C08G 61/10* (2013.01); *C08J 9/286* (2013.01); *H01M 8/1025* (2013.01); *H01M 8/1032* (2013.01); *C08G 2261/145* (2013.01); *C08G 2261/516* (2013.01); *C08J 2201/05* (2013.01); *C08J 2365/02* (2013.01); *H01M 2008/1095* (2013.01); *H01M 2300/0082* (2013.01)

(58) Field of Classification Search
CPC ............. C08G 61/10; C08G 2261/145; C08G 2261/516; C08J 9/286; C08J 2201/05; C08J 2365/02; H01M 8/1025; H01M 8/1032; H01M 2208/1095; H01M 2300/0082
USPC ........................................................ 521/181
See application file for complete search history.

(56) References Cited

FOREIGN PATENT DOCUMENTS

| KR | 10-2006-0071275 A | 6/2006 |
|---|---|---|
| KR | 10-1823822 B1 | 1/2018 |
| WO | WO 2017/014284 A1 | 1/2017 |

OTHER PUBLICATIONS

Ding et al. "One-step Assembly of a Hierarchically Porous Phenolic Resin-type Polymer with High Stability for CO2 Capture and Conversion", Chemical Communications, 2016, vol. 52, pp. 12294-12297, (Year: 2016).*
Katsoulidis et al., "Phloroglucinol Based Microporous Polymeric Organic Frameworks wilh-OH Functional Groups and High CO2 Cap Lure Capacity", Chemistry of Materials, 2011, vol. 23, No. 7, pp. 1818-1824. (Year: 2011).*
Lu et al. "Sulfonate-Grafted Porous Polymer Networks for Preferential CO2 Adsorption at Low Pressure", Journal of the American Chemical Society, 2011, vol. 133, No. 45, pp. 18126-18129 (Year: 2011).*
Kang et al. "Cost-Effective, High-Performance Porous-Organic-Polymer Conductors Functionalized with Sulfonic Acid Groups by Direct Postsynthetic Substitution", Angewandie Chemie International Edition, 2016, vol. 55, No. 52, pp. 16123-16126. (Year: 2016).*
Lu, Weigang et al., "Sulfonate-Grafted Porous Polymer Networks for Preferential CO2 Adsorption at Low Pressure", *Journal of the American Chemical Society*, vol. 133.45, 2011 (pp. 18126-18129).
Katsoulidis, Alexandros P et al., "Phloroglucinol Based Microporous Polymeric Organic Frameworks with-OH Functional Groups and High CO2 Capture Capacity," *Chemistry of Materials*, vol. 23, Issue 7, Apr. 12, 2011 (pp. 1818-1824).
Ding, Meili et al., "One-step assembly of a hierarchically porous phenolic resin-type polymer with high stability for CO 2 capture and conversion." *Chemical Communications*, vol. 52, Sep. 28, 2016 (pp. 12294-12297).

(Continued)

*Primary Examiner* — Michael M. Bernshteyn
(74) *Attorney, Agent, or Firm* — NSIP Law

(57) ABSTRACT

The present invention relates to a porous organic polymer-based hydrogen ion conductive material and a method for preparing the same. More specifically, the present invention relates to a method for preparing a porous organic polymer (POP)-based material with high proton conductivity that is applicable to a membrane electrode assembly (MEA) of a proton exchange membrane fuel cell (PEMFC). The porous organic polymer-based proton conductive material of the present invention can be prepared in an easy and simple manner by microwave treatment and acid treatment requiring short processing time and low processing cost. In addition, the porous organic polymer-based proton conductive material of the present invention can be developed into a highly proton conductive material having the potential to replace Nafion through a simple post-synthesis modification. Therefore, the porous organic polymer-based proton conductive material of the present invention is suitable for use in a proton exchange membrane fuel cell.

9 Claims, 7 Drawing Sheets

(56) References Cited

OTHER PUBLICATIONS

Kang, Dong Won, et al., "Cost-Effective, High-Performance Porous-Organic-Polymer Conductors Functionalized with Sulfonic Acid Groups by Direct Postsynthetic Substitution," *Angewandte Chemie International Edition*, vol. 55, Issue 52, Dec. 23, 2016 (pp. 16123-16126).

Kang, Dong Won, et al., "A conductive porous organic polymer with superprotonic conductivity of a Nafion-type electrolyte." *Journal of Materials Chemistry A*, vol. 5, Issue 33, Jul. 25, 2017 (pp. 17492-17498).

International Search Report dated Aug. 23, 2018 in counterpart International Patent Application No. PCT/KR2018/003619 (3 pages in English and 3 pages in Korean).

\* cited by examiner

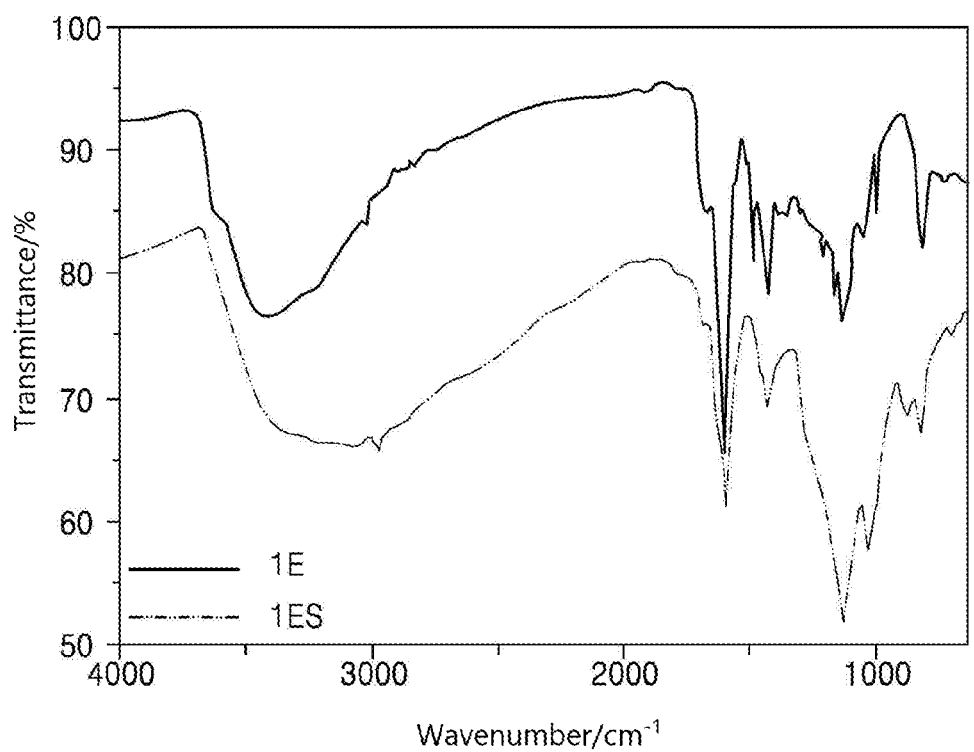
[Fig. 1]

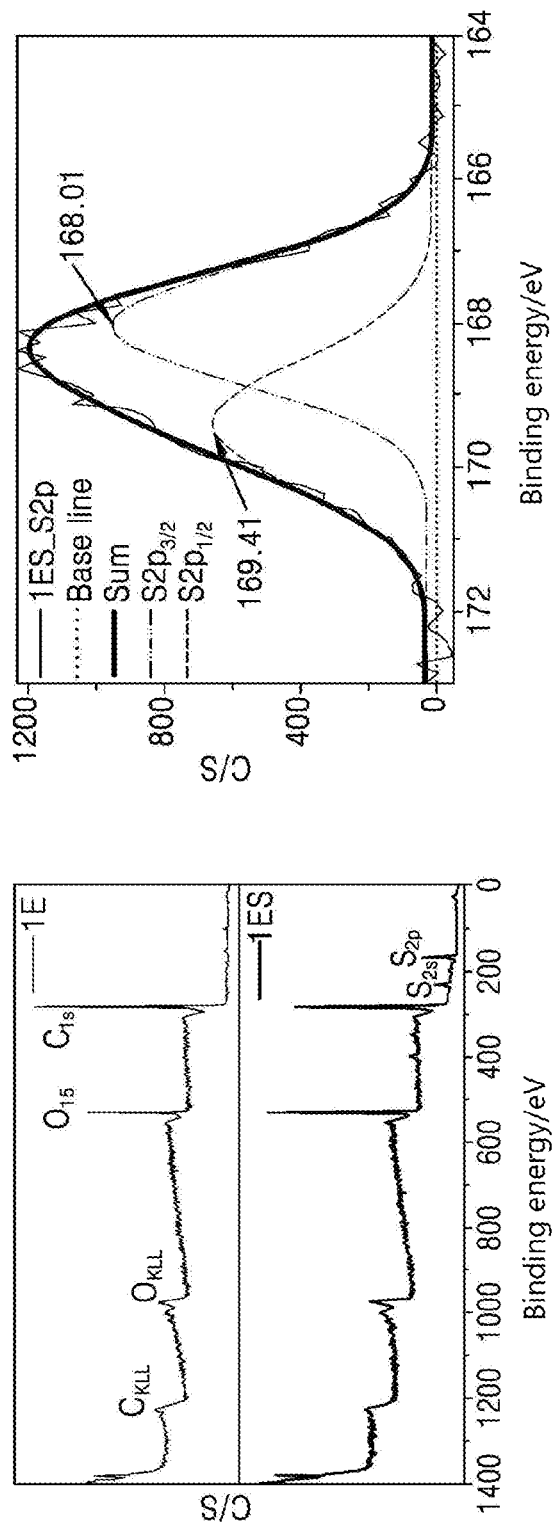
[Fig. 2]

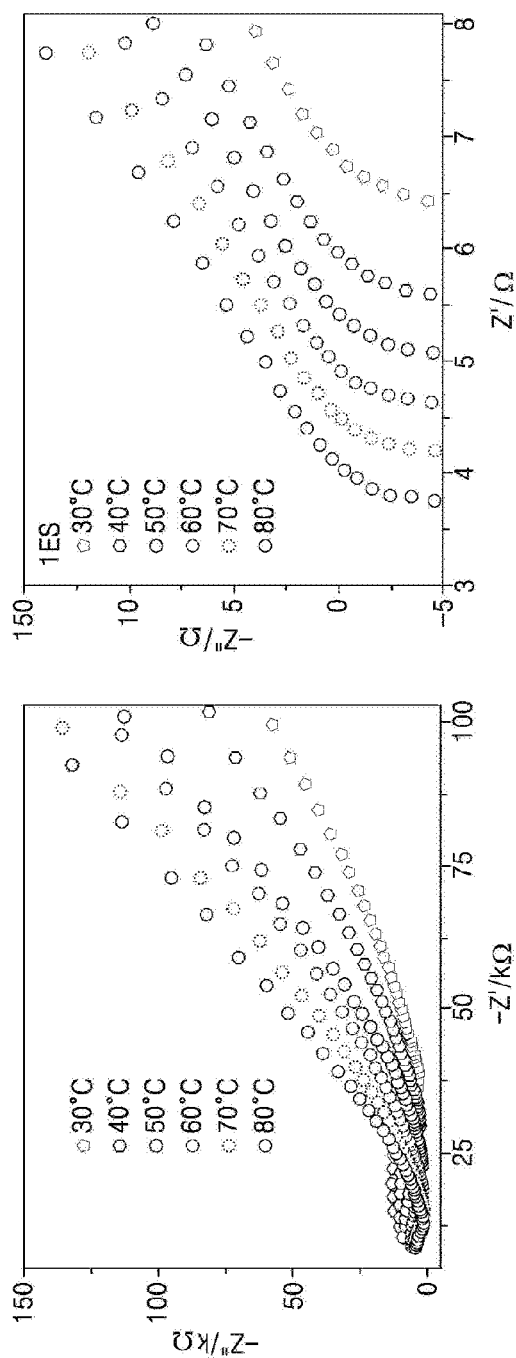
[Fig. 3]

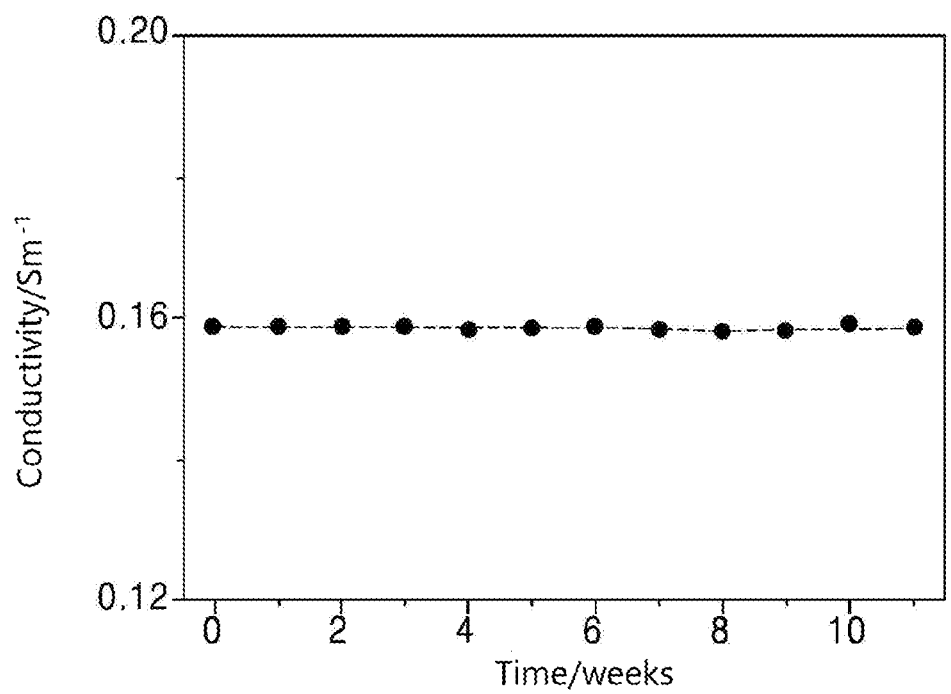
[Fig. 4]

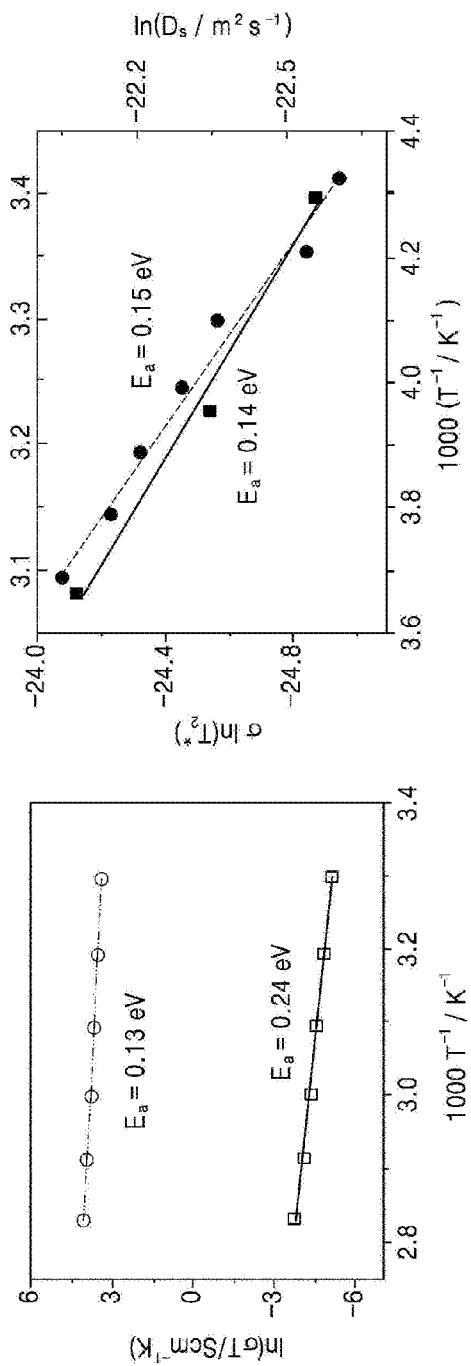
[Fig. 5]

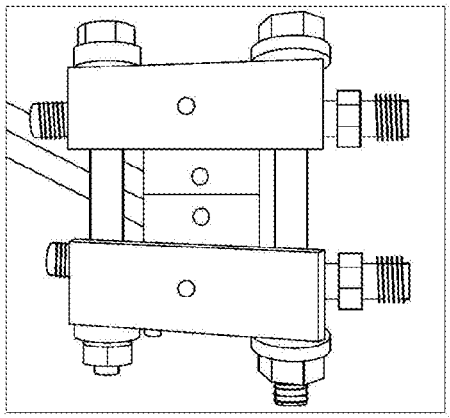
Single cell
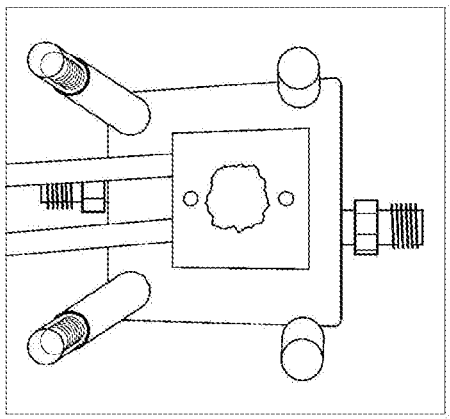
Gasket + Catalyst-coated gas diffusion layer (GDL) + Pellet
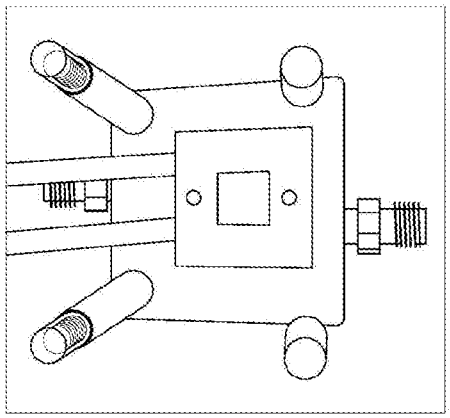
Gasket + Catalyst-coated gas diffusion layer (GDL)
[Fig. 6]

[Fig. 7]
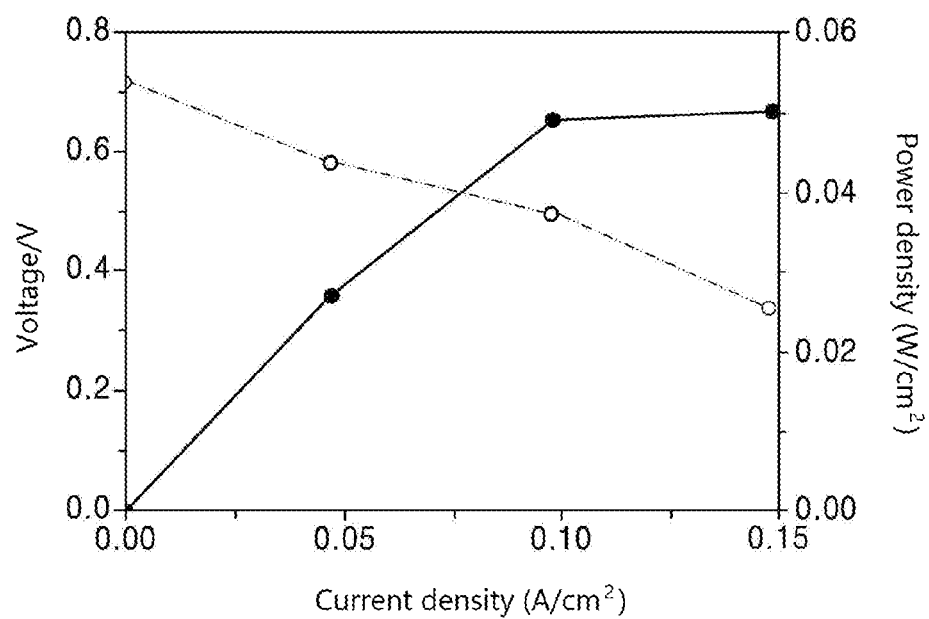

EXPANDABLE POROUS ORGANIC POLYMER-BASED HYDROGEN ION CONDUCTIVE MATERIAL AND METHOD FOR PREPARING SAME

CROSS REFERENCE TO RELATED APPLICATIONS

This application is a U.S. National Stage Application of International Application No. PCT/KR2018/003619, filed on Mar. 27, 2018, which claims the benefit under 35 USC 119(a) and 365(b) of Korean Patent Application No. 10-2017-0047985, filed on Apr. 13, 2017, in the Korean Intellectual Property Office, the entire disclosure of which is incorporated herein by reference for all purposes.

TECHNICAL FIELD

The present invention relates to a porous organic polymer-based hydrogen ion conductive material and a method for preparing the same. More specifically, the present invention relates to a method for preparing a highly proton conductive material that is applicable to a membrane electrode assembly (MEA) of a proton exchange membrane fuel cell (PEMFC) and is based on an expandable porous organic polymer (POP) into which more sulfonic acid groups can be introduced.

BACKGROUND ART

Nafion developed by DuPont in the 1960's has been used to date as a reference material in the field of proton exchange membrane fuel cells and is a representative material that is still currently being investigated. Nafion exhibits a proton conductivity as high as 0.1 S/cm under hydrated conditions but has several disadvantages such as poor thermal conductivity. Thus, considerable research efforts have been made to develop a promising material to replace Nafion.

In recent years, there has been a growing tendency to use porous organic polymers in the fuel cell field due to their diverse structures and large surface areas. However, porous organic polymers surpassing the performance of Nafion have not yet been developed. Starting materials for porous organic polymers are also difficult to synthesize and suffer from very low yield, limiting their practical use.

Under these circumstances, there is a strong need to develop a method for synthesizing a material whose stability is maintained in the operating range of proton exchange membrane fuel cells from a porous organic polymer in an easy and simple manner in high yield. In addition, there is a need to modify the synthesized material so as to have high proton conductivity comparable to that of Nafion, which is also of great importance.

DETAILED DESCRIPTION OF THE INVENTION

Problems to be Solved by the Invention

The present invention has been made in an effort to solve the above-described problems and intends to provide an expandable porous organic polymer-based material that exhibits a proton conductivity equal to or higher than that of Nafion, is simple to synthesize, and can be easily modified, thus being suitable as a solid electrolyte material of a PEMFC, and a method for preparing the porous organic polymer-based material.

The present invention also intends to provide a porous organic polymer-based membrane electrode assembly (MEA) that exhibits high proton conductivity and good long-term stability.

Means for Solving the Problems

One aspect of the present invention provides a porous organic polymer-based framework containing sulfonic acid groups, represented by Formula 1ES:

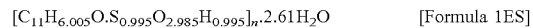

$[C_{11}H_{6.005}O.S_{0.995}O_{2.985}H_{0.995}]_n \cdot 2.61H_2O$      [Formula 1ES]

wherein n is an integer from 1 to 100.

The porous organic polymer-based framework may have a proton conductivity of $9.00 \times 10^{-2}$ S/cm to $2.00 \times 10^{-1}$ S/cm in the temperature range of 30° C. to 80° C. at a relative humidity of 90%.

The porous organic polymer-based framework may have a proton conductivity of $1.00 \times 10^{-1}$ S/cm to $2.00 \times 10^{-1}$ S/cm at a temperature of 80° C. and a relative humidity of 90%.

Another aspect of the present invention provides a method for preparing the porous organic polymer-based framework containing sulfonic acid groups represented by Formula 1ES, the method including adding a sulfonic acid compound to a compound represented by Formula 1E:

$[C_{11}H_7O_2]_n \cdot 0.6716H_2O \cdot 0.2941HCl$      [Formula 1E]

wherein n is an integer from 0 to 100, in an organic solvent, and reacting the mixture.

The compound represented by Formula 1E may be prepared by a microwave-assisted solvothermal reaction.

The microwave-assisted solvothermal reaction may be carried out in a microwave reactor.

The organic solvent may be methylene chloride and the sulfonic acid compound may be chlorosulfonic acid.

The power of the microwaves may be 50 to 300 W.

The pressure of the microwaves may be 80 to 200 psi.

The method is suitable for the preparation of the porous organic polymer-based framework.

Effects of the Invention

The porous organic polymer-based proton conductive material of the present invention can be prepared in an easy and simple manner by microwave treatment and acid treatment requiring short processing time and low processing cost. In addition, the porous organic polymer-based proton conductive material of the present invention can be developed into a highly proton conductive material having the potential to replace Nafion through a simple post-synthesis modification. Therefore, the porous organic polymer-based proton conductive material of the present invention is suitable for use in a proton exchange membrane fuel cell.

Furthermore, a membrane electrode assembly (MEA) based on the porous organic polymer-based proton conductive material of the present invention has excellent mechanical properties, good dimensional stability, and high proton conductivity.

BRIEF DESCRIPTION OF THE DRAWINGS

FIG. 1 shows infrared spectra of the compound of Formula 1E and the compound of Formula 1ES.

FIG. 2 shows the binding energy peaks of the compound of Formula 1E and the compound of Formula 1ES, which were measured by X-ray photoelectron spectroscopy.

FIG. 3 shows Nyquist plots showing the proton conductivities of the compound of Formula 1E and the compound of Formula 1ES with varying temperatures.

FIG. 4 shows the proton conductivities of the compound of Formula 1ES measured at 1-week intervals after exposure to 80° C. and 90% RH.

FIG. 5 shows Arrhenius plots of the compound of Formula 1E and the compound of Formula 1ES, the slopes of which represent the activation energies of the compounds, and activation energies calculated by measuring $^2$H solid-state NMR spectra and self-diffusion coefficients.

FIG. 6 shows images illustrating the construction of a membrane electrode assembly using the compound of Formula 1ES according to the present invention in the form of a single cell consisting of a gasket, a catalyst-coated gas diffusion layer, and a pellet.

FIG. 7 shows a fuel-cell polarization plot of the compound of Formula 1ES at 80° C. for a $H_2/O_2$ electrochemical cell.

BEST MODE FOR CARRYING OUT THE INVENTION

A porous organic polymer-based framework and a method for preparing the porous organic polymer-based framework according to the present invention will now be described in detail.

The present invention provides a porous organic polymer-based framework containing sulfonic acid groups, represented by Formula 1ES:

[$C_{11}H_{6.005}O.S_{0.995}O_{2.985}H_{0.995}]_n$·2.61$H_2O$      [Formula 1ES]

wherein n is an integer from 1 to 100.

The porous organic polymer-based framework of the present invention has a proton conductivity of $9.00 \times 10^{-2}$ S/cm to $2.00 \times 10^{-1}$ S/cm in the temperature range of 30° C. to 80° C. at a relative humidity of 90%, preferably $1.00 \times 10^{-1}$ S/cm to $2.00 \times 10^{-1}$ S/cm at a temperature of 80° C. and a relative humidity of 90%.

In one aspect of the present invention, the high conductivity of the compound of Formula 1ES is attributable to the presence of strong Brønsted acid sites (—$SO_3H$) on the organic linker. The acidic functional groups help water absorb into the limited spaces to enable the organization of hydrophilic domains, resulting in the formation of efficient proton conduction pathways. This is similar to that observed in Nafion. Specifically, it can be considered that covalent bonds of the strong acid units capable of providing a large number of protons to the proton conduction pathways are present in the porous organic polymer-based framework represented by Formula 1ES, with the result that the porous organic polymer-based framework has the highest conductivity corresponding to that of Nafion.

The present invention also provides a method for preparing the porous organic polymer-based framework containing sulfonic acid groups represented by Formula 1ES, the method including adding a sulfonic acid compound to a compound represented by Formula 1E:

[$C_{11}H_7O_2]_n$·0.6716$H_2O$·0.2941HCl      [Formula 1E]

wherein n is an integer from 0 to 100, in an organic solvent, and reacting the mixture.

The entire procedure for synthesizing the compound represented by Formula 1ES is as follows:

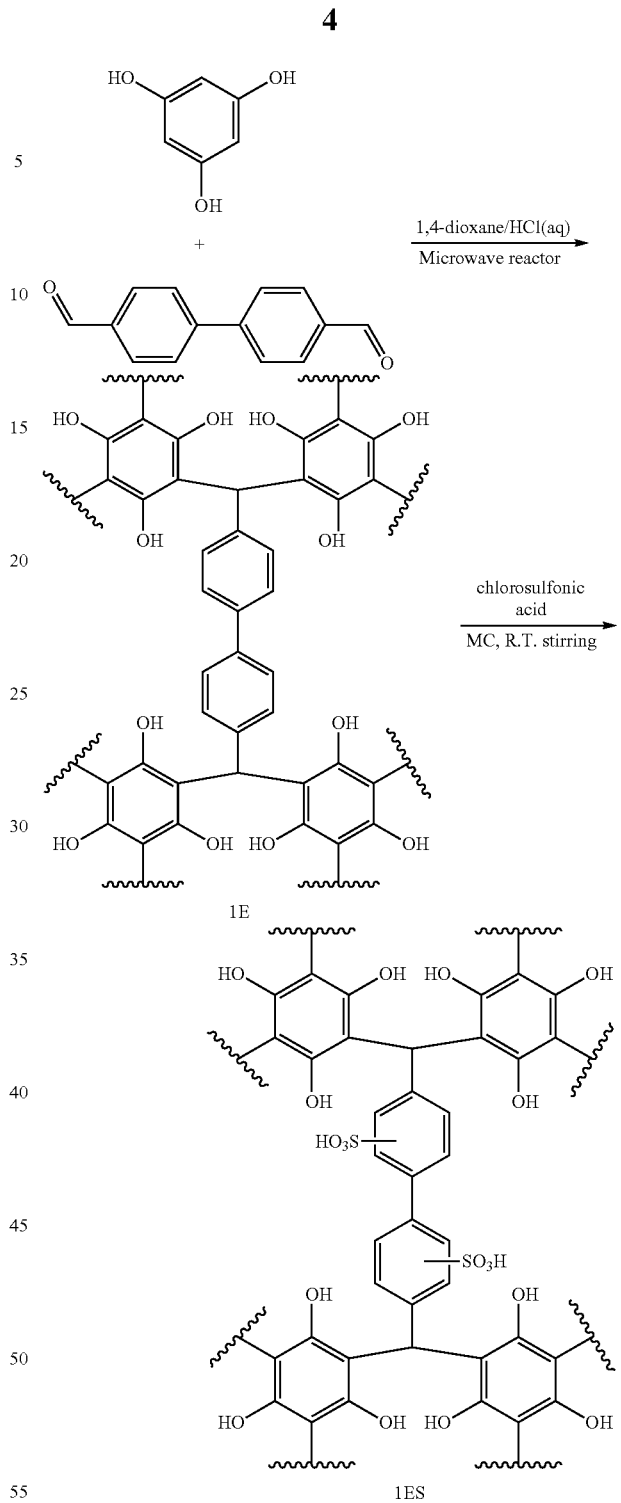

The compound represented by Formula 1E can be prepared by a microwave-assisted solvothermal reaction. The microwave-assisted solvothermal reaction can be carried out in a microwave reactor.

In one aspect of the present invention, the power of the microwaves may be 50 to 300 W, preferably 100 to 150 W to prepare the compound represented by Formula 1E. If the power of the microwaves is less than the lower limit defined above, the desired structure of the compound represented by Formula 1E is difficult to form. Meanwhile, if the power of the microwaves exceeds the upper limit defined above, many side reactions may occur.

In one aspect of the present invention, the pressure of the microwaves may be 80 to 200 psi, preferably 100 to 150 psi to prepare the compound represented by Formula 1E. If the pressure of the microwaves is less than the lower limit defined above, other structures of the framework may be formed. Meanwhile, if the pressure of the microwaves exceeds the upper limit defined above, many side reactions may occur.

The method of the present invention is suitable for the preparation of the porous organic polymer-based framework.

MODE FOR CARRYING OUT THE INVENTION

The present invention will be explained in more detail with reference to the following examples. However, these examples are provided to assist in understanding the invention and are not intended to limit the scope of the present invention.

EXAMPLES

Microwave-assisted synthesis of expandable porous organic polymer and introduction of large number of sulfonic acid groups into the skeleton using chlorosulfonic acid

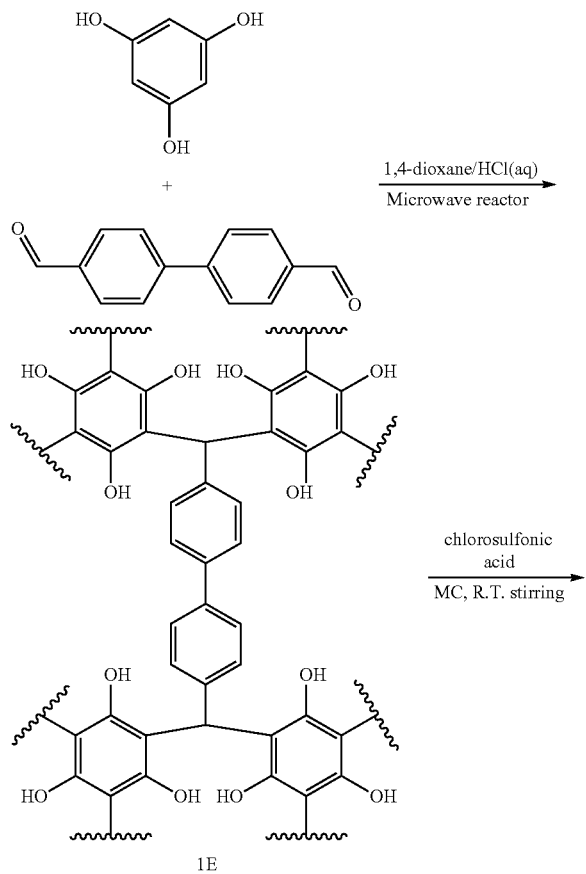

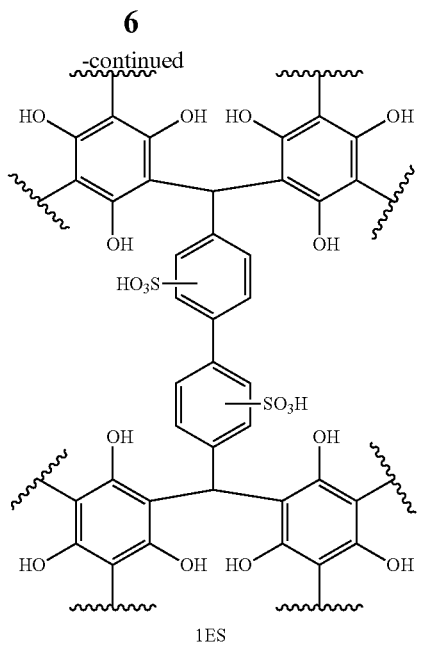

Synthesis Example 1. Preparation of Compound Represented by Formula 1E 1,3,5-Trihydroxybenzene (0.5 g, 3.96 mmol) and 4,4'-biphenyldicarboxyaldehyde (0.625 g, 2.98 mmol) were dissolved in 15 mL of 1,4-dioxane. The solution was transferred to a 35 mL Pyrex cell for microwave reaction and 1 mL of 35% HCl was added thereto. The opening of the Pyrex cell was closed with a PTFE cap. The reaction was allowed to proceed in a microwave reactor (CEM Discover) at 220° C. for 2 h. The reaction mixture was stirred in 200 mL of THF/$H_2O$ for 1 h, filtered, washed with THF/water, methanol, and acetone, and sufficiently dried in an oven at 100° C. The solvent molecules present in the internal pores of the product were removed using a vacuum pump at 120° C. for 12 h. The yield of the product was about 68.4%.

Synthesis Example 2. Preparation of the Compound Represented by Formula 1ES 24 mL of methylene chloride and 200 mg of the compound represented by Formula 1E prepared in Synthesis Example 1 were stirred in a 100 mL round-bottom flask for a while. The flask was placed in an ice-water bath. The reaction was allowed to proceed for 4 days while slowly adding dropwise 2.5 mL of chlorosulfonic acid. After completion of the reaction, the reaction mixture was poured into a 1000 mL beaker containing ice and water. The resulting mixture was stirred until the ice was completely melted, filtered, washed with water/methanol and acetone until a pH of 7 was reached, and dried in an oven at 100° C. overnight. Thereafter, the solvent molecules present in the internal pores of the product were removed using a vacuum pump at 120° C. for 12 h.

Test Example 1. Confirmation of Introduction of Sulfonic Acid Groups ($SO_3H$) into the Framework Infrared spectroscopy and X-ray photoelectron spectroscopy were used to confirm the introduction of sulfonic acid groups into the compound represented by Formula 1ES prepared in Synthesis Example 2.

As shown in FIG. 1, peaks corresponding to S—OH stretching and O=S=O asymmetric stretching were found at 884 cm$^{-1}$ and 1150 cm$^{-1}$, respectively, as confirmed by infrared spectroscopy.

As shown in FIG. 2, $S_{2s}$ and $S_{2p}$ peaks were distinctly observed by X-ray photoelectron spectroscopy. Peaks corresponding to the binding energies of $S2_{p3/2}$ and $S2_{p1/2}$ states of $SO_3H$ were found at 168.01 eV and 169.41 eV, respectively, demonstrating the introduction of sulfonic acid groups into the framework.

Test Example 2. Evaluation of Proton Conductivities with Increasing Temperature Using Impedance Analyzer The compound of Formula 1E prepared in Synthesis Example 1 and the compound of Formula 1ES prepared in Synthesis Example 2 were shaped into pellets using a compressor. Subsequently, each of the pellets was placed on a home-made platinum electrode and its proton conductivities were evaluated using an impedance analyzer (Solartron SI 1260) with varying temperatures from 30° C. to 80° C. in a thermo-hygrostat set to 90% RH.

As shown in FIG. 3, the compound of Formula 1E showed a conductivity of 1.88×10$^{-5}$ S/cm at 80° C. and the compound of Formula 1ES showed a conductivity of 1.59×10$^{-1}$ S/cm at 80° C.

The greatly improved conductivities are explained by the introduction of sulfonic acid groups and are comparable to the performance of Nafion.

Test Example 3. Evaluation of Long-Term Performance Stability of the Material An evaluation was made as to whether the compound of Formula 1ES could maintain its stable performance for a long time under conditions where the best performance was achieved. To this end, the proton conductivity of the sample was measured every week after exposure to 80° C. and 90% RH.

As shown in FIG. 4, the initial performance of the material was maintained for a period longer than 11 weeks. This result suggests that the material can be sufficiently practically used in a fuel cell due to its good long-term performance stability.

Test Example 4. Investigation of Mechanism of Proton Conduction in the Material FIG. 5 shows Arrhenius plots of the compound of Formula 1E and the compound of Formula 1ES (see the left plots of FIG. 5). The activation energy of the compound of Formula 1ES was 0.13 eV, as calculated from the slope of the corresponding Arrhenius plot.

This value lies in the range of values corresponding to the typical Grotthuss mechanism. As evidence supporting this, activation energies were calculated by measuring $^2H$ solid-state NMR spectra and self-diffusion coefficients (see the right plots of FIG. 5). As a result, the activation energies were 0.14 eV and 0.15 eV, which are in good agreement with the value calculated from the slope of the Arrhenius plot, supporting the same conclusion.

Test Example 5. Actual Membrane Electrode Assembly Construction and Open Circuit Voltage Testing As shown in FIG. 6, a membrane electrode assembly was constructed using the compound of Formula 1ES and its practicality was evaluated. The open circuit voltage of the membrane electrode assembly at 80° C. and 100% RH was measured to be ~0.72 V (FIG. 7).

INDUSTRIAL APPLICABILITY

The porous organic polymer-based proton conductive material of the present invention can be prepared in an easy and simple manner by microwave treatment and acid treatment requiring short processing time and low processing cost. In addition, the porous organic polymer-based proton conductive material of the present invention can be developed into a highly proton conductive material having the potential to replace Nafion through a simple post-synthesis modification. Therefore, the porous organic polymer-based proton conductive material of the present invention is suitable for use in a proton exchange membrane fuel cell.

The invention claimed is:

1. A porous organic polymer-based framework containing sulfonic acid groups, represented by Formula 1ES:

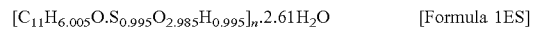
[Formula 1ES]

wherein n is an integer from 1 to 100.

2. The porous organic polymer-based framework according to claim 1, wherein the porous organic polymer-based framework has a proton conductivity of 9.00×10$^{-2}$ S/cm to 2.00×10$^{-1}$ S/cm in the temperature range of 30° C. to 80° C. at a relative humidity of 90%.

3. The porous organic polymer-based framework according to claim 2, wherein the porous organic polymer-based framework has a proton conductivity of 1.00×10$^{-1}$ S/cm to 2.00×10$^{-1}$ S/cm at a temperature of 80° C. and a relative humidity of 90%.

4. A method for preparing a porous organic polymer-based framework containing sulfonic acid groups represented by Formula 1ES:

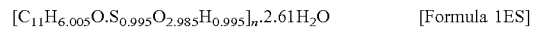
[Formula 1ES]

wherein n is an integer from 1 to 100, the method comprising adding a sulfonic acid compound to a compound represented by Formula 1E:

[Formula 1E]

wherein n is an integer from 1 to 100, in an organic solvent, and reacting the mixture.

5. The method according to claim 4, wherein the compound represented by Formula 1E is prepared by a microwave-assisted solvothermal reaction.

6. The method according to claim 5, wherein the microwave-assisted solvothermal reaction is carried out in a microwave reactor.

7. The method according to claim 4, wherein the organic solvent is methylene chloride and the sulfonic acid compound is chlorosulfonic acid.

8. The method according to claim 6, wherein the power of the microwaves is 50 to 300 W.

9. The method according to claim 6, wherein the pressure of the microwaves is 80 to 200 psi.

* * * * *